(12) United States Patent
Suzuki (10) Patent No.: US 7,791,666 B2
(45) Date of Patent: Sep. 7, 2010

(54) UNIT FOR SETTING FUNCTION OF DISPLAYED MENU

(75) Inventor: Yuji Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1285 days.

(21) Appl. No.: 10/456,477

(22) Filed: Jun. 9, 2003

(65) Prior Publication Data

US 2004/0027473 A1 Feb. 12, 2004

(30) Foreign Application Priority Data

Jun. 17, 2002 (JP) ............................. 2002-175276

(51) Int. Cl.
*H04N 5/222* (2006.01)
(52) U.S. Cl. .................. 348/333.01; 348/333.02; 348/333.03
(58) Field of Classification Search .............. 348/14.05, 348/185, 333.01; 345/157; 715/856–862
See application file for complete search history.

(56) References Cited

U.S. PATENT DOCUMENTS 6,314,439 B1 * 11/2001 Bates et al. ................. 715/209
6,829,009 B2 12/2004 Sugimoto
2001/0015721 A1 * 8/2001 Byun et al. .................. 345/169
2002/0030754 A1 * 3/2002 Sugimoto ............... 348/333.02

FOREIGN PATENT DOCUMENTS

| CN | 1335951 A1 | 2/2002 |
|---|---|---|
| CN | 1344105 A | 4/2002 |
| EP | 1 903 424 A1 | 3/2008 |
| JP | 11-194868 | 7/1999 |

* cited by examiner

*Primary Examiner*—Brian Casler
*Assistant Examiner*—Nasir Shahrestani
(74) *Attorney, Agent, or Firm*—Oblon, Spivak, McClelland, Maier & Neustadt, L.L.P.

(57) ABSTRACT

In a unit for setting a function of a displayed menu, a choosing and displaying operation of selecting one of a plurality of groups of a menu and displaying all the functional particulars belonging to the chosen group chosen from the plurality of divided groups of the menu, on a same screen page of a display is performed, a choosing operation of selecting one of the plurality of functional particulars displayed on the display and a choosing and setting operation of selecting and setting one of a plurality of functional condition values displayed on the display corresponding to the selected functional particular are performed, and a displaying operation of displaying the plurality of the functional condition values which correspond to the selected functional particular.

7 Claims, 5 Drawing Sheets

UNIT FOR SETTING FUNCTION OF DISPLAYED MENU

BACKGROUND OF THE INVENTION

1. Field of the Invention

The present invention relates to a unit for setting a function of a displayed menu assembled in an electronic apparatus such as an imaging device to be used, and adapted to set an operating condition to functional particulars of the menu displayed on a display of the electric apparatus.

2. Description of the Prior Art

In a digital camera, in order to photograph an image that a photographer wishes to take, it is necessary to perform optimum photographic functional settings with respect to various photo-functional particulars such as an aperture diaphragm, shutter speed, amount of flash light, focus and so on. Simultaneously, necessary use-functional settings are also performed with respect to various use-functional particulars such as date and hour setting, LCD brightness setting and so on.

The photo-functional particulars have, other than the aforementioned functional particulars, settings such as exposure adjustment, white balance, sharpness, photometry method, long time exposure, ISO sensitivity and so on. The use-functional particulars have, also, other than the aforementioned use-functional particulars, energy saving setting, format, auto power-off time setting, setting for buzzer, setting for the time of image confirming, LCD color adjusting, language selection, video type selection, etc.

In the digital camera, it is needed to take a photogenic subject by setting a functional condition with respect to these photo-functional particulars and use-functional particulars, respectively.

In a conventional digital camera, several photo-functional particulars and use-functional particulars such as the aforementioned ones are divided into a plurality of groups, and each of the divided groups of a menu is displayed on a liquid crystal display (LCD) in such a manner as to be able to change over them on a screen-by-screen basis.

That is to say, when a menu of one of the respective groups is displayed on the screen, the other menus are not displayed. These menus which are not displayed are displayed by changing over the screens.

Additionally, in the conventional digital camera, a plurality of tabs is arranged along a periphery of the LCD screen to selectively display the divided groups of the menu. For example, it is structured that when one of the groups is selected by a first tab, only the functional particulars included in the selected group are displayed in an arrangement order as the menu on the LCD, and the functional particulars that are not displayed initially are sequentially displayed on the LCD by controlling a select key to perform a scrolling operation.

However, in the conventional digital camera, because displaying of the LCD are adapted to be changed over such as from the displaying of a first group of the menu to a displaying of a second group of the menu by selecting each of the tabs, it is necessary to bring the position of the cursor on a currently displayed image of the LCD back to a position of the first tab of a group to which the selected functional particular of the plurality of functional particulars belongs to by a scrolling operation, when operating a second tab. Accordingly, the second tab cannot be operated until the cursor is brought back to the first tab.

Therefore, if the cursor is currently located at the last functional particular in the arrangement order of the first group on the LCD, it is necessary to move the cursor to the position of the first tab by the long scrolling operation, thereby placing an operational burden on an operator. In addition, the time it takes to operate the second tab from a current state becomes long, and hence, there is a drawback that the setting of the desired photographing function and the use-function cannot be carried out efficiently.

SUMMARY OF THE INVENTION

The present invention has been made in view of the above mentioned circumstances regarding the setting of the photographing functions and the use-functions on a digital camera, and it is an object of the invention to provide a unit for setting a function of a displayed menu capable of setting the desired functional condition values relative to various functional particulars of an electronic apparatus, efficiently and in a simple method without making a mistake based on a display menu of a display.

To achieve the above mentioned object, according to the present invention, a plurality of selection menus of respective groups is collectively displayed on a single screen, and respective selection menus are displayed by changing over screens on a screen-by-screen basis or by scrolling the screen.

According to a structure of the present invention, a unit for setting a function of a displayed menu is set in an electronic device to be used, a menu of functional particulars of the electronic device is displayed on a display of the electronic device, and the unit is adapted to set a functional condition value to the functional particular chosen from the displayed menu.

The unit comprises: a means for displaying menu selection aligned along a peripheral part of a display screen of the display, by which a choosing and displaying, operation of selecting one of a plurality of groups of a menu and displaying all the functional particulars belonging to the chosen group of the plurality of divided menus, on a same screen page of the display is performed independently and freely in a first direction: means for setting functional condition provided near the peripheral part of the display screen of the display, and configured to choose one of the plurality of functional particulars displayed on said display by said means for displaying menu selection in a direction perpendicular to the first direction, the means for setting functional condition also configured to choose and set one of a plurality of functional condition values displayed on said display corresponding to the chosen functional particular in the direction perpendicular to said first direction: and means for displaying operational condition configured to display the plurality of functional condition values corresponding to the functional particular chosen by the means for setting functional condition on the display.

The means for displaying operational condition is provided proximity to the peripheral part of the menu display screen.

According to such a unit for setting the function of the displayed menu, one of the displayed selections of the menu divided into the plurality of groups arranged along the peripheral part of the menu display screen of the display is chosen by the means for displaying menu selection in the first direction independently and freely, and thereby all the functional particulars of the divided menu belonging to the chosen group are displayed on the same screen of the display.

Subsequently, one of the group of functional particulars constituting the divided groups of the menu displayed on the display, is chosen and designated in the direction perpendicular to the first direction by the means for setting functional condition provided proximity to the peripheral part of the menu display screen of the display. Moreover, the plurality of functional condition values corresponding to the chosen and designated functional particular is displayed on the display by the means for displaying the operational condition located proximity to the peripheral part of the menu display screen.

Then, one of the plurality of functional condition values displayed on the display is chosen and designated in the direction perpendicular to the first direction by the means for setting operational condition, and thereby the setting on the functional condition that chosen and designated is finally performed.

Accordingly, even in a process of choosing and designating operation operated by the means for setting the functional condition for the plurality of functional particulars displayed on the display, or in a process of displaying operation by the means for displaying operational condition of the functional condition values corresponding to the functional particular chosen and designated, the choosing and displaying operation of the plurality of menu groups by the means for displaying menu selection is performed freely independent with respect to those operations, so that an operator can avoid an operation mistake, in efficient manner with reduced time for the operation, and can set the desired, appropriate functional condition value.

In one embodiment, the means for displaying menu selection is arranged along an upper part of the peripheral part of the menu display screen in a horizontal direction and the means for setting functional condition is provided in proximity to a lower part of the peripheral part of said menu display screen.

Additionally, in one embodiment, the electronic device is the imaging device.

DETAILED DESCRIPTION OF THE PREFERRED EMBODIMENTS

One embodiment of the present invention will be described hereunder with reference to the accompanying drawings.

Here, an electronic apparatus in the present preferred embodiment is a digital camera.

Figure 1:
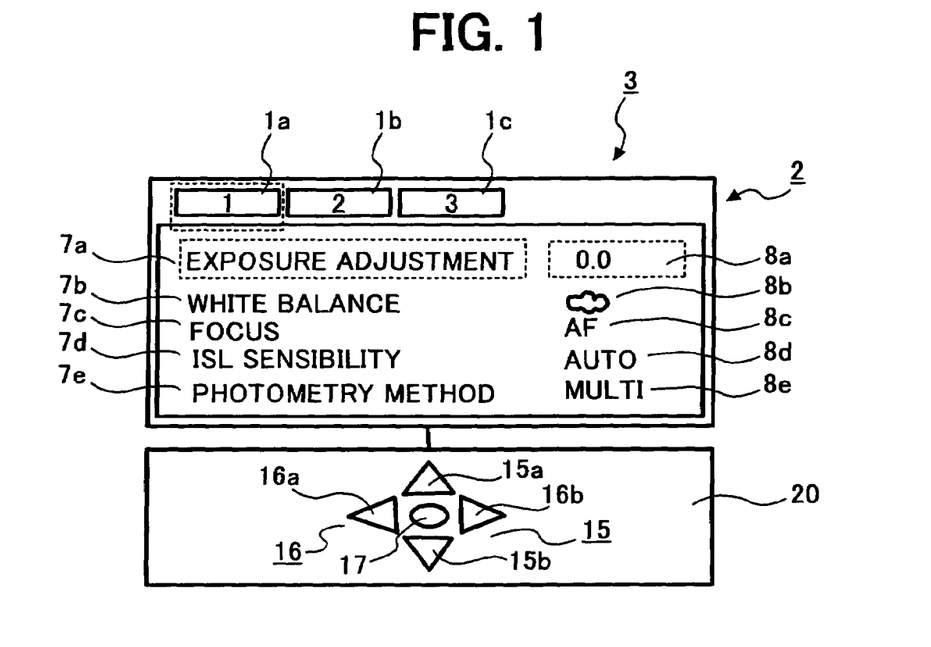
FIG. 1 is an explanatory diagram to show displaying of a display when an operation on displaying and selection of a first menu is being carried out according to one embodiment of the present invention.
Figure 2:
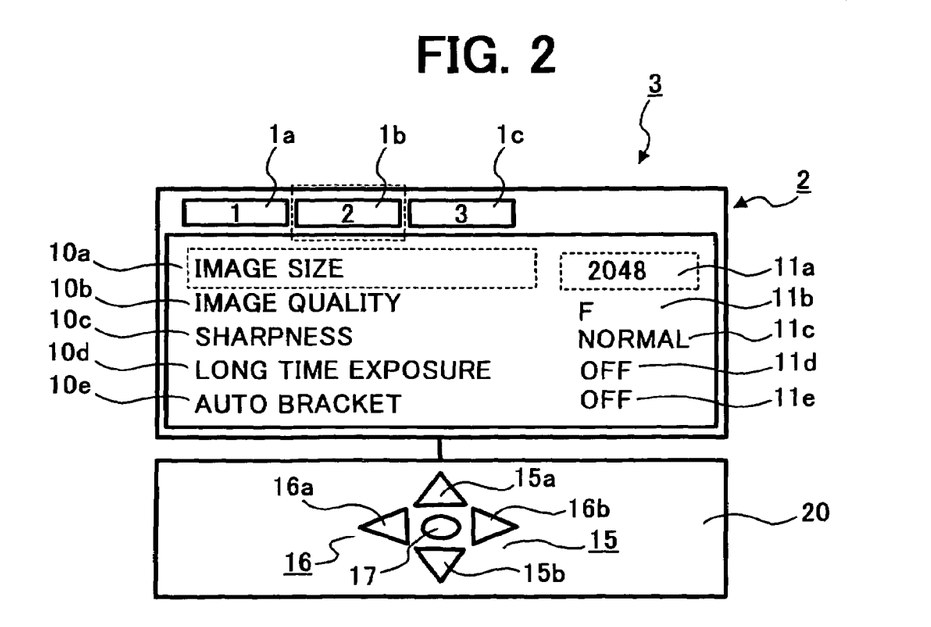
FIG. 2 is an explanatory diagram to show displaying of the display when an operation on displaying and selection of a second menu is being carried out according to the embodiment shown in FIG. 1.
Figure 3:
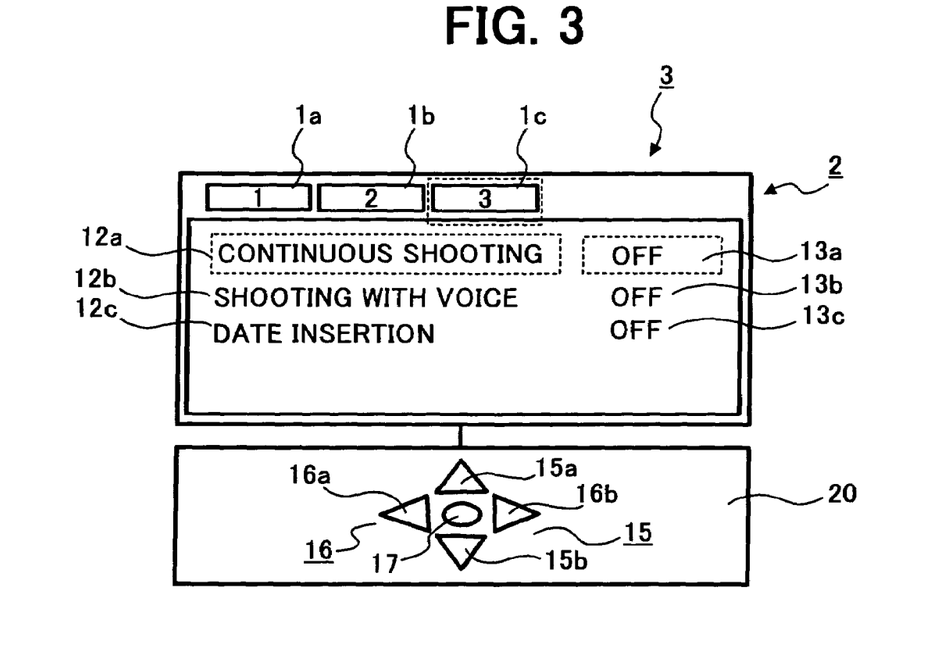
FIG. 3 is an explanatory diagram to show displaying of the display when an operation on displaying and selection of a third menu is being carried out according to the embodiment shown in FIG. 1.

The present embodiment that is set in the digital camera to be used as shown in FIGS. 1-3 includes a display 3 on which, on the occasion of an imaging operation, various photo-functional particulars, use-functional particulars and a corresponding plurality of functional condition values which are to be set to the digital camera are displayed, and an operating panel 20 which is connected to the display 3 for carrying out operation on setting of the desired functional condition values on the photo-functional particulars and the use-functional particulars.

In the present embodiment, a display menu including the photo-functional particulars, the use-functional particulars and the functional condition values, is divided into 3 groups which are a first menu, a second menu and a third menu, and on the display 3, there is provided a menu display screen 2 on which these menus are displayed in a change-over manner. Along an upper periphery of the menu display screen page 2, tabs 1a-1c are arranged for selecting the first menu to the third menu, respectively.

Furthermore, the operating panel 20 is provided with a left-right key 16 that includes a left key 16a and a right key 16b to choose and designate operation of the tabs 1a-1c, an up-down key 15 that includes an up key 15a and a down key 15b to choose and designate the photo-functional particulars, the use-functional particulars and the functional condition values which are displayed on the menu display screen 2, and an OK key 17 to set and determine the selection and the designation of the left-right key 16 and the up-down key 15, respectively, and to choose and set the displayed functional condition value.

The present embodiment of such a structure and operation on selecting and displaying will be described with reference to FIGS. 1-3.

In FIG. 1, when the setting of choosing and displaying of a tab 1 is conducted by using a cursor to select and designate the tab 1a by operating the left-right key 16, there are displayed on the menu display screen 2 as shown in FIG. 1 the functional particulars of menus of the first group and corresponding current functional condition values.

The menus on the first group in this example include a functional particular 7a indicating "exposure adjustment" and a corresponding functional condition value 8a indicating "0.0", a functional particular 7b indicating "white balance" and a corresponding functional condition value 8b indicating "trait figure", a functional particular 7c indicating "focus" and a corresponding functional condition value 6c indicating "AF", a functional particular 7d indicating "ISO sensitivity" and a corresponding functional condition value 8d indicating "AUTO", and a functional particular 7e indicating "photometry method" and a corresponding functional condition value 8e indicating "multi".

Accordingly, all the menus of the first group are displayed on the same screen, and the new functional particulars with the functional condition values of the first group are not displayed on the menu display screen 2 even if the up-down key 15 is operated to scroll.

Similarly in FIG. 2, when the setting of choosing and displaying of a tab 2 is conducted by using the cursor to select and designate the tab 1b by operating the left-right key 16, there are displayed the functional particulars of menus of the second group and corresponding current functional condition values on the menu display screen 2 as shown in FIG. 2.

The menus on the second group in this example include a functional particular 10a indicating the "image size" and a corresponding functional condition value 11a indicating "2048", a functional particular 10b indicating the "image quality" and a corresponding functional condition value 11b indicating "F", a functional particular 10c indicating the "sharpness" and a corresponding functional condition value 11c indicating "normal", a functional particular 10d indicating "long time exposure" and a corresponding functional condition value 11d indicating "OFF", and a functional particular 10e indicating "auto bracket" and a corresponding functional condition value 11e indicating "OFF".

All the menus of the second group are also displayed on the same screen page, and the new functional particulars with functional condition values of the first group are not displayed on the menu display screen 2 even if the up-down key 15 is operated to scroll.

Similarly in FIG. 3, when the setting of choosing and displaying of a tab 3 is conducted by using the cursor to select and designate the tab 1c by operating the left-right key 16, there are displayed the functional particulars of menus of the third group and corresponding current functional condition values on the menu display screen 2 as shown in FIG. 3.

The menus on the third group in this example include a functional particular 12a indicating the "continuous shooting" and a corresponding functional condition value 13a indicating "OFF", a functional particular 12b indicating the "shooting with voice" and a corresponding functional condition value 13b indicating "OFF", and a functional particular 12c indicating "date insertion" and a corresponding functional condition value 13c indicating "OFF".

All the menus of the third group are also displayed on the same screen, and the new functional particulars with functional condition values of the third group are not displayed on the menu display screen 2 even if the up-down key 15 is operated to scroll.

Next, the present embodiment regarding the operation on choosing of the functional particulars will be described with reference to FIGS. 4-7.

Figure 4:
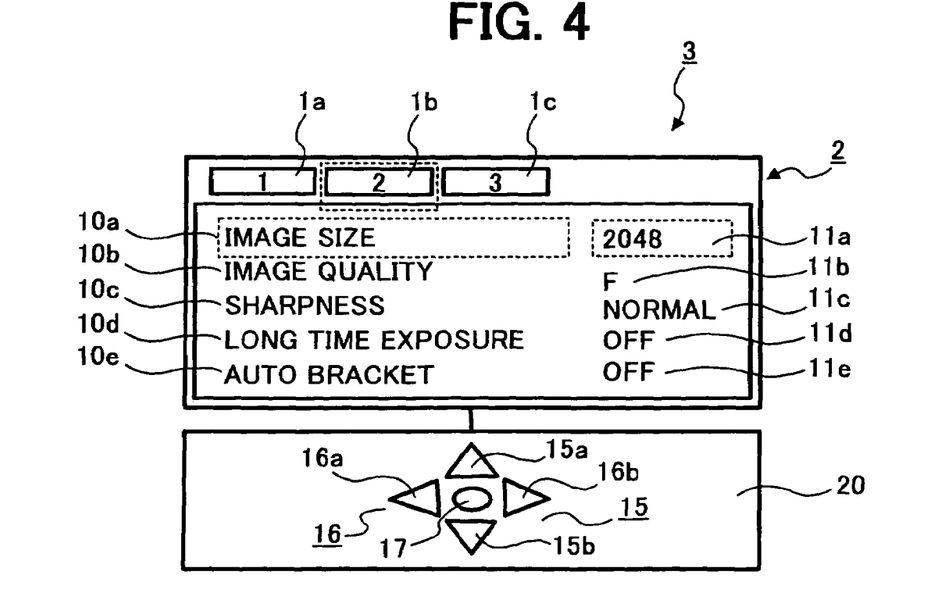
FIG. 4 is an explanatory diagram to show displaying of the display when an operation on choosing a first functional particular, carried out subsequent to the operation on displaying and selection of the second menu in the embodiment shown in FIG. 1, is being carried out.

In FIG. 4, as already described with reference to FIG. 2, the setting on choosing and displaying of the tab 2 is conducted with the use of the cursor to choose and designate the tab 1b by operating the left-right key 16. There are displayed on the menu display screen 2 the functional particulars of the menus related to the second group and the corresponding current functional condition values, and the cursor for choosing the functional particulars is located on the functional particular 10a indicating the "image size" as an original position, and its corresponding functional condition value 11a indicating "2048".

In this state, when the setting on choosing of the functional particular 10a is conducted by operating the OK key 17 to choose the functional particular 10a indicating the "image size", the selection of the functional particular 10a in the menus related to the second group is determined.

Figure 5:
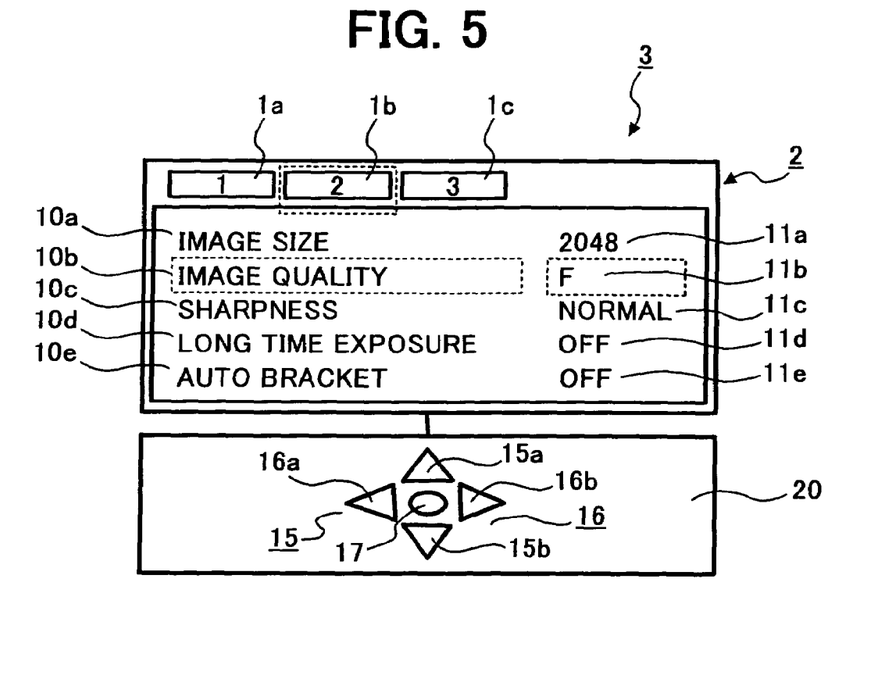
FIG. 5 is an explanatory diagram to show displaying of the display when an operation on choosing a second functional particular, carried out subsequent to the operation on displaying and selection of the second menu in the embodiment shown in FIG. 1 is being carried out.
Figure 6:
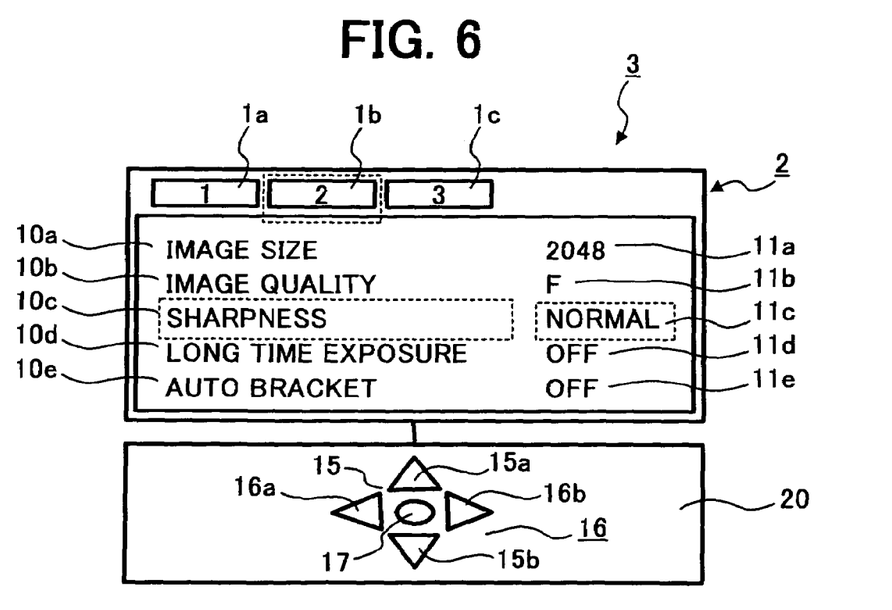
FIG. 6 is an explanatory diagram to show displaying of the display when an operation on choosing a third functional particular, carried out subsequent to the operation on displaying and selection of the second menu in the embodiment shown in FIG. 1 is being carried out.
Figure 7:
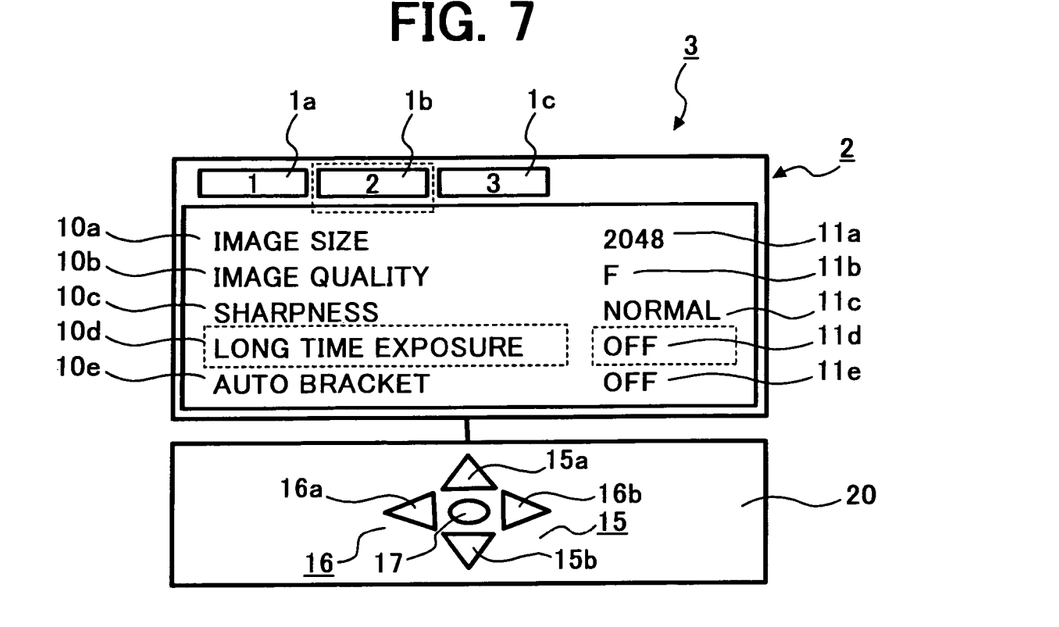
FIG. 7 is an explanatory diagram to show displaying of the display when an operation on choosing a fourth functional particular, carried out subsequent to the operation on displaying and selection of the second menu in the embodiment shown in FIG. 1 is being carried out.
Figure 8:
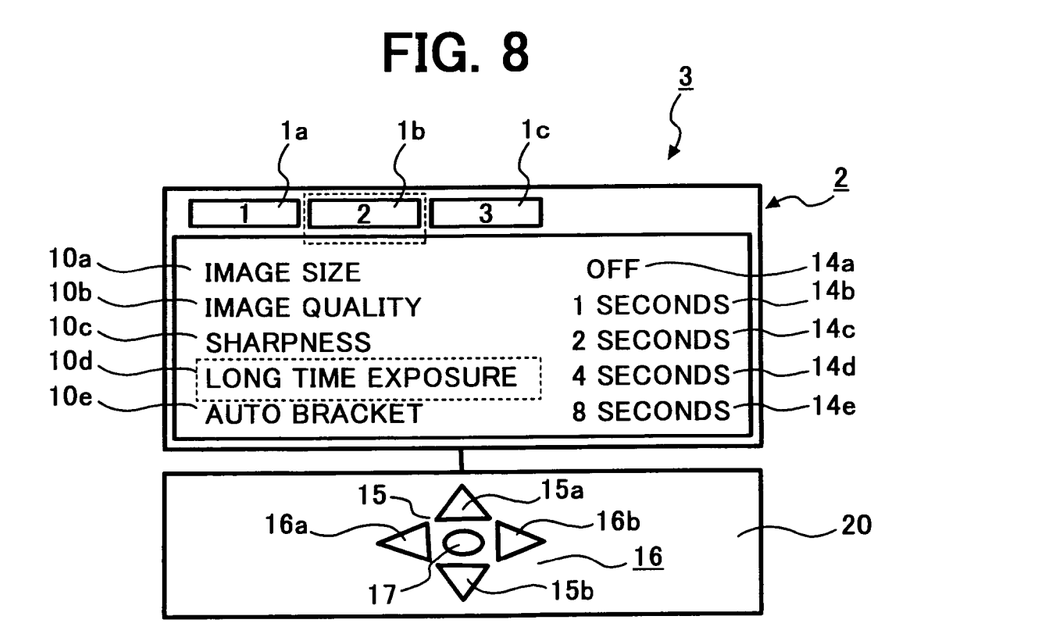
FIG. 8 is an explanatory diagram to show displaying of the display when an operation on displaying of a plurality of operational conditions corresponding to the fourth functional particular on the screen of FIG. 7 is being carried out.
Figure 9:
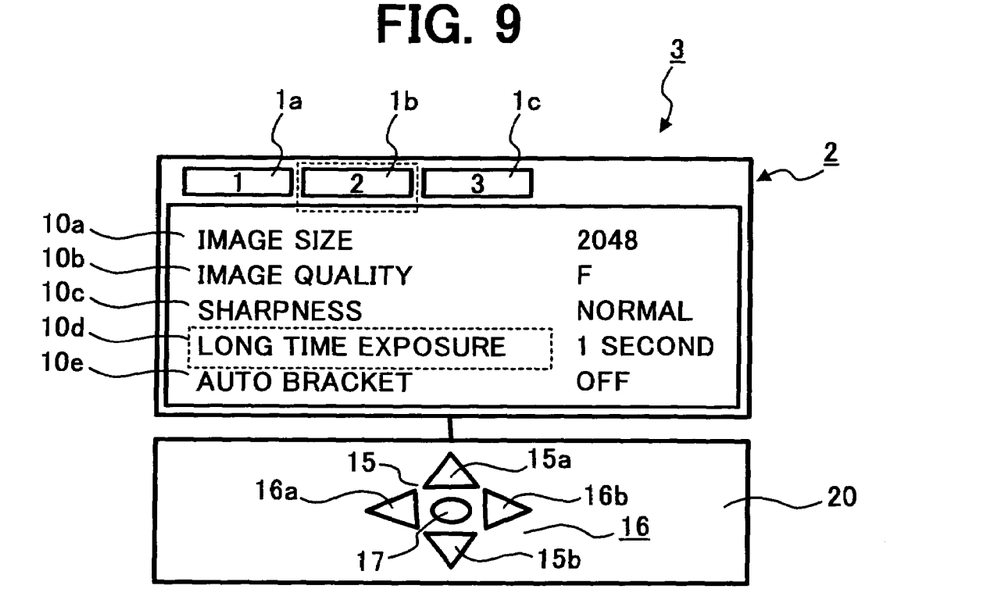
FIG. 9 is an explanatory diagram to show displaying of the display when a functional condition value of one second is selected and set for the screen shown in FIG. 8.

In a case of choosing a second functional particular as illustrated in FIG. 5, when the setting on choosing of the functional particular 10b is conducted prior to the state in which the setting on choosing and operating of the functional particular 10a as the first functional particular illustrated in FIG. 4 is carried out, by operating the down key 15b of the up-down key 15b for moving the cursor of choosing the functional particulars to the position corresponding to the functional particular 10b indicating the "image quality" and corresponding functional condition value 11b indicating "F", the selection of the functional particular 10b of the menus related to the second group is determined Moreover, in a case of choosing a third functional particular as illustrated in FIG. 6, when the setting on choosing of the functional particular 10c is conducted prior to the state in which the setting on choosing and operating of the functional particular 10a as the first functional particular illustrated in FIG. 4 is carried out, by operating the down key 15b of the up-down key 15b for moving the cursor of choosing of the functional particulars to the position corresponding to the functional particular 10c indicating the "sharpness" and the corresponding functional condition value 11c indicating "normal", the selection of the functional particular 10c of the menus related to the second group is determined Furthermore, in a case of choosing a fourth functional particular as illustrated in FIG. 7, when the setting on choosing of the functional particular 10d is conducted prior to the state in which the setting on choosing and operating of the functional particular 10a as the first functional particular illustrated in FIG. 4 is carried out, by operating the down key 15b of the up-down key 15b for moving the cursor of choosing of the functional particular to the position corresponding to the functional particular 10d indicating the "long time exposure" and the corresponding functional condition value 11d indicating "OFF", the selection of the functional particular 10d of the menus related to the second group is determined Next, the operation on setting functional condition in a case in which a functional condition is to be selected and set for the four functional particulars according to the present embodiment will be described with reference to the FIGS. 8 and 9.

In the operation of displaying an operational conditions as shown in FIG. 8, functional condition values 14a-14e respectively indicating "OFF", "1 second", "2 seconds", "3 seconds", and "4 seconds" corresponding to the functional particular 10d in which the selecting and setting have been already determined, are displayed on the menu display screen 2 as shown in FIG. 8, by operating the OK key 17 after the determination of setting and choosing of the functional particular 10d indicating "long time exposure" as explained with a reference to FIG. 7.

In this state, when the operator moves the cursor to the position of the functional condition value 14b indicating "1 second" by operating the up key 15a of the up-down key 15, the setting and choosing of the functional condition value 14b indicating "1 second" is determined for the functional particular 10d indicating "long time exposure", and thereby as shown in FIG. 9, there is displayed on the menu display screen 2 the functional condition value 14d indicating "1 second" for the functional particular 10d indicating "long time exposure" that has been chosen and set.

According to the present embodiment as described above, one of the divided 3 groups of the menu each including the functional particulars of the digital camera is displayed on the menu display screen 2 of the display 3 by designating the tabs 1a-1c by using the left-right key 15, and the setting on functional condition values corresponding to the chosen functional particular is carried out from the displayed menu.

In this embodiment, while in each of the following processes of: the choosing and designating operation for the functional particulars 7a-7e, 10a-10e or 12a-12c of the group chosen and displayed on the display 3 by the operation of the up-down key 15; the choosing and designating operation of one of the functional particulars by the operation of the OK key 17; the displaying operation of the functional condition values 14a-14e by the operation of the OK key 17 corresponding to one of the functional particulars chosen and designated; the choosing and designating operation of the functional condition values which have been displayed by the up-down key 15; and the designating operation by the OK key 17 for the functional condition value chosen and designated, it is possible to choose the tabs 1a-1c independently and arbitrary by the operation of the left-right key 16. On the menu display screen 2 the menu of the group that is chosen will be displayed soon after the tabs 1a-1c have been chosen.

According to the present embodiment as described above, even in the process of choosing and designating operation operated by the down key 15 for the plurality of functional particulars 7a-7e, 10a-10e or 12a-12c displayed on the display 3, in the process of displaying operation of the functional condition values 14a-14e corresponding to the functional particular 10d chosen and designated, or in the process of choosing and designating of one of the functional conditional values 14a-14e displayed, it is possible to choose the tabs 1a-1c freely by the operation of the left-right key 16 independent with respect to these operating processes. As the tabs 1a-1c are chosen, the menu selected from the groups of menu is displayed on the menu display screen 2 at once in place of the current screen. Therefore, the operator can avoid an operation mistake, in an efficient manner with reduced time for the operation, and can set the desired, appropriate functional condition value in short time, by an easy way of operation, only by operating the up-down key 15 and the OK key 17 for the various functional particulars on imaging and use of the digital camera.

While it has been described in the present embodiment that the electronic device is a digital camera, it is to be understood that the invention is not limited to this embodiment, and it is applicable to copying machines or various system devices.

In accordance with the present invention, the unit is set in the electronic device to be used, the menu on the functional particulars of the electronic device is displayed on the display of the electronic device, and the setting on the functional condition values are made to the functional particular chosen from the displayed menu. In this case, in the first place, one of the displayed selections of the menu divided into the plurality of groups arranged along the peripheral part the menu display screen of the display is chosen by a means for displaying menu selection in a first direction independently and freely, and thereby all the menus belonging to the chosen group are displayed on the same screen of the display.

In the second place, one of the group of functional particulars constituting the divided menu displayed on the display by the means for displaying menu selection, is chosen and designated in a direction perpendicular to the first direction by a means for setting functional condition provided proximity to the peripheral part of the menu display surface screen of the display. Moreover, the plurality of the functional condition values corresponding to the chosen and designated functional particular is displayed on the display by a means for displaying operational condition provided proximity to the peripheral part of the menu display screen.

Then, one of the plurality of functional condition values displayed on the display is chosen and designated in the direction perpendicular to the first direction by the means for setting functional condition, and thereby the setting on the functional condition chosen and designated is finally conducted.

Therefore, according to the present embodiment, even in the process of choosing and designating operation operated by the means for setting functional condition for the plurality of functional particulars displayed on the display, or in the process of displaying operation by the means for displaying the operational condition of the functional condition values corresponding to the functional particular chosen and designated, the choosing and displaying operation on of the plurality of menu groups by the means for displaying menu selection is conducted freely and independent with respect to those operations, so that the operator can avoid an operation mistake, in efficient manner with reduced time for the operation, and can set the desired, appropriate functional condition value for the various functional particulars on imaging and use of the digital camera.

What is claimed is:

1. A unit for setting a function of a displayed menu, the unit being introduced in an electronic device and configured to display functional particulars of the electronic device on a display of the electronic device and set a functional condition value to a functional particular selected from the displayed functional particulars, the menu being divided into a plurality of groups, the unit comprising:
a first selector configured to select, regardless of a position of a cursor highlighting at least one of the functional particulars displayed on a display screen of the display, one of the plurality of groups of the menu aligned in a first direction of the display screen of the display and upon selection of the one of the plurality of groups of the menu, all of the functional particulars belonging to the selected one of the plurality of groups are displayed on the display screen of the display;
a second selector configured to select one of the functional particulars of the group displayed on the display by the first selector and aligned in a second direction; and
a third selector configured to display the plurality of functional condition values corresponding to the functional particular selected from the functional particulars of the group by the second selector on the display,
the second selector being configured to select one of the plurality of functional condition values of the selected functional particular displayed on the display by the third selector and aligned in the second direction, and
the first selector being configured to display the functional particulars belonging to another selected one of the plurality of groups of the menu, when the first selector is being operated to select another of the plurality of groups of the menu during the selection by the second selector of one of the functional particulars belonging to the selected one of the plurality of groups of the menu,
wherein when the first selector is operated to select said another one of the plurality of groups of the menu during the displaying on the display by the third selector of the plurality of functional condition values corresponding to the functional particular selected from the functional particulars of the group by the second selector, all of the functional particulars belonging to said another one of the plurality of groups of the menu are displayed.

2. A unit for setting a function of a displayed menu, the unit being introduced in an electronic device and configured to display functional particulars of the electronic device on a display of the electronic device and set a functional condition value to a functional particular selected from the displayed functional particulars, the menu being divided into a plurality of groups, the unit comprising:
a first selector configured to select, regardless of a position of a cursor highlighting at least one of the functional particulars displayed on a display screen of the display, one of the plurality of groups of the menu aligned in a first direction of the display screen of the display and upon selection of the one of the plurality of groups of the menu, all of the functional particulars belonging to the selected one of the plurality of groups are displayed on the display screen of the display;

a second selector configured to select one of the functional particulars of the group displayed on the display by the first selector and aligned in a second direction; and a third selector configured to display the plurality of functional condition values corresponding to the functional particular selected from the functional particulars of the group by the second selector on the display, the second selector being configured to select one of the plurality of functional condition values of the selected functional particular displayed on the display by the third selector and aligned in the second direction, and the first selector being configured to display the functional particulars belonging to another selected one of the plurality of groups of the menu, when the first selector is being operated to select another of the plurality of groups of the menu during the selection by the second selector of one of the functional particulars belonging to the selected one of the plurality of groups of the menu, wherein when the first selector is operated to select said another one of the plurality of groups of the menu during the selection by the second selector of one of the plurality of functional condition values of the selected functional particular displayed on the display by the third selector, all of the functional particulars belonging to said another one of the plurality of groups of the menu are displayed.

3. A unit for setting a function of a displayed menu, the unit being introduced in an electronic device and configured to display functional particulars of the electronic device on a display of the electronic device and set a functional condition value to a functional particular selected from the displayed functional particulars, the menu being divided into a plurality of groups, the unit comprising:

a first selector configured to select, regardless of a position of a cursor highlighting at least one of the functional particulars displayed on a display screen of the display, one of the plurality of groups of the menu aligned in a first direction of the display screen of the display and upon selection of the one of the plurality of groups of the menu, all of the functional particulars belonging to the selected one of the plurality of groups are displayed on the display screen of the display;

a second selector configured to select one of the functional particulars of the group displayed on the display by the first selector and aligned in a second direction; and a third selector configured to display the plurality of functional condition values corresponding to the functional particular selected from the functional particulars of the group by the second selector on the display, the second selector being configured to select one of the plurality of functional condition values of the selected functional particular displayed on the display by the third selector and aligned in the second direction, the first selector being configured to display the functional particulars belonging to another selected one of the plurality of groups of the menu, when the first selector is being operated to select another of the plurality of groups of the menu during the selection by the second selector of one of the functional particulars belonging to the selected one of the plurality of groups of the menu, and the third selector is configured to set one of the plurality of functional condition values selected by the second selector, wherein when the first selector is operated to select said another one of the plurality of groups of the menu during the setting by the third selector of one of the plurality of functional condition values selected by the second selector, all of the functional particulars belonging to said another one of the plurality of groups of the menu are displayed.

4. A method for setting a function of a displayed menu, the method being for an electronic device and configured to display functional particulars of the electronic device on a display of the electronic device and set a functional condition value to a functional particular selected from the displayed functional particulars, the menu being divided into a plurality of groups, the method comprising:

a) selecting, regardless of a position of a cursor highlighting at least one of the functional particulars displayed on a display screen of the display, one of the plurality of groups of the menu aligned in a first direction of the display screen of the display, and upon selection of the one of the plurality of groups of the menu, all of the functional particulars which belong to the selected one of the plurality of groups are displayed on the display screen of the display;

b) selecting one of the functional particulars of the group displayed on the display upon operation of the selecting a), the functional particulars aligned in a second direction;

c) displaying the plurality of functional condition values corresponding to the functional particular selected from the functional particulars of the group by the selecting b) on the display;

d) selecting one of the plurality of functional condition values of the selected functional particular displayed on the display by the displaying c) and aligned in the second direction; and immediately executing the selecting a) when operation is made to select the plurality of groups of the menu during when the selecting b) is being executed, the method further comprising:

immediately executing the selecting a) when operation is made to select the plurality of groups of the menu during when the displaying c) is being executed.

5. A method for setting a function of a displayed menu, the method being for an electronic device and configured to display functional particulars of the electronic device on a display of the electronic device and set a functional condition value to a functional particular selected from the displayed functional particulars, the menu being divided into a plurality of groups, the method comprising:

a) selecting, regardless of a position of a cursor highlighting at least one of the functional particulars displayed on a display screen of the display, one of the plurality of groups of the menu aligned in a first direction of the display screen of the display, and upon selection of the one of the plurality of groups of the menu, all of the functional particulars which belong to the selected one of the plurality of groups are displayed on the display screen of the display;

b) selecting one of the functional particulars of the group displayed on the display upon operation of the selecting a), the functional particulars aligned in a second direction;

c) displaying the plurality of functional condition values corresponding to the functional particular selected from the functional particulars of the group by the selecting b) on the display;

d) selecting one of the plurality of functional condition values of the selected functional particular displayed on the display by the displaying c) and aligned in the second direction;

immediately executing the selecting a) when operation is made to select the plurality of groups of the menu during when the selecting b) is being executed; and immediately executing the selecting a) when operation is made to select the plurality of groups of the menu during when the selecting d) is being executed.

6. A method for setting a function of a displayed menu, the method being for an electronic device and configured to display functional particulars of the electronic device on a display of the electronic device and set a functional condition value to a functional particular selected from the displayed functional particulars, the menu being divided into a plurality of groups, the method comprising:

a) selecting, regardless of a position of a cursor highlighting at least one of the functional particulars displayed on a display screen of the display, one of the plurality of groups of the menu aligned in a first direction of the display screen of the display, and upon selection of the one of the plurality of groups of the menu, all of the functional particulars which belong to the selected one of the plurality of groups are displayed on the display screen of the display;

b) selecting one of the functional particulars of the group displayed on the display upon operation of the selecting a), the functional particulars aligned in a second direction;

c) displaying the plurality of functional condition values corresponding to the functional particular selected from the functional particulars of the group by the selecting b) on the display;

d) selecting one of the plurality of functional condition values of the selected functional particular displayed on the display by the displaying c) and aligned in the second direction;

immediately executing the selecting a) when operation is made to select the plurality of groups of the menu during when the selecting b) is being executed;

e) setting one of the plurality of functional condition values selected by the selecting d); and immediately executing the selecting and the displaying a) when operation is made to select the plurality of groups of the menu when the setting e) is being executed.

7. An electronic device, comprising:

a display;

a display controller which aligns and displays a plurality of tabs on the display in a first direction, and which aligns and displays a plurality of functional particulars on the display in a second direction;

a first operating section arranged in a same direction as the first direction, and which selects one of the plurality of tabs;

a second operating section which selects one of the plurality of functional particulars that corresponds to one of the plurality of tabs selected by the first operating section; and a third operating section which determines one of the plurality of functional particulars selected by the second operating section, wherein the display controller is configured to align and display a plurality of functional condition values that corresponds to one of the plurality of functional particulars determined by the third operating section on the display in the second direction, and wherein the display controller is configured to, when another one of the plurality of tabs different from the selected one of the plurality of tabs is selected by the first operating section during a time when the functional particulars that correspond to the tab selected by the first operating section are displayed, align and display another plurality of functional particulars which corresponds to that another one of the plurality of tabs selected by the first operating section on the display in the second direction, wherein the second operating section selects one of the plurality of functional condition values that corresponds to one of the plurality of functional particulars determined by the third operating section, and wherein the display controller, when the another one of the plurality of tabs different from the selected one of the plurality of tabs is selected by the first operating section during when the selection of one of the plurality of function particulars by the second operating section is being carried out or when the selection of one of the plurality of functional condition values by the second operating section is being carried out, immediately aligns and displays the another plurality of functional particulars which corresponds to that another one of the plurality of tabs selected by the first operating section on the display in the second direction.

* * * * *